United States Patent
Cho

(10) Patent No.: US 9,223,493 B2
(45) Date of Patent: Dec. 29, 2015

(54) MOBILE TERMINAL, ELECTRONIC DEVICE AND METHOD OF CONTROLLING THE SAME

(75) Inventor: Sanghyun Cho, Anyang (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 12/959,118

(22) Filed: Dec. 2, 2010

(65) Prior Publication Data

US 2011/0134030 A1 Jun. 9, 2011

(30) Foreign Application Priority Data

Dec. 3, 2009 (KR) .................. 10-2009-0118974

(51) Int. Cl.
*H04N 5/44* (2011.01)
*H04N 21/41* (2011.01)
*G06F 3/044* (2006.01)
*G06F 3/0488* (2013.01)
*G06F 3/0354* (2013.01)
*G06F 3/14* (2006.01)

(52) U.S. Cl.
CPC .......... *G06F 3/0488* (2013.01); *G06F 3/03547* (2013.01); *G06F 3/1454* (2013.01); *G06F 2203/0339* (2013.01); *G09G 2340/0407* (2013.01); *G09G 2340/0442* (2013.01); *G09G 2340/0492* (2013.01)

(58) Field of Classification Search
CPC ............ H04N 21/4126; H04N 5/4403; G06F 3/0488; G06F 3/1454; G06F 3/03547; G06F 2203/0339; G09G 2340/0492; G09G 2340/0407; G09G 2340/0442
USPC ................ 345/156–184; 715/740; 348/14.04, 348/14.05, 114
See application file for complete search history.

(56) References Cited

U.S. PATENT DOCUMENTS

| | | | | |
|---|---|---|---|---|
| 7,889,175 B2 * | 2/2011 | Kryze et al. | .................. | 345/156 |
| 2006/0111093 A1 | 5/2006 | Shim et al. | | |
| 2008/0168514 A1 * | 7/2008 | Jeon | ........................... | 725/110 |
| 2009/0079696 A1 * | 3/2009 | Shin et al. | ...................... | 345/169 |
| 2010/0070995 A1 * | 3/2010 | Pan | ................................. | 725/34 |

FOREIGN PATENT DOCUMENTS

| | | | | |
|---|---|---|---|---|
| JP | 2001157284 A * | 6/2001 | ............... | H04Q 9/00 |
| KR | 10-2006-0056446 A | 5/2006 | | |
| WO | WO 2009/006224 A1 | 1/2009 | | |

* cited by examiner

*Primary Examiner* — Lun-Yi Lao
*Assistant Examiner* — Ibrahim Khan
(74) *Attorney, Agent, or Firm* — Birch, Stewart, Kolasch & Birch, LLP

(57) ABSTRACT

A mobile terminal, an electronic device and a method of controlling the same are provided. The electronic device can be controlled easily and intuitively by using the mobile terminal including a touch device.

24 Claims, 17 Drawing Sheets

MOBILE TERMINAL, ELECTRONIC DEVICE AND METHOD OF CONTROLLING THE SAME

BACKGROUND

1. Field

This document relates to a mobile terminal and an electronic device and, more particularly, to a mobile terminal, an electronic device and a method of controlling the electronic device easily and intuitively through a touch device included in the mobile terminal.

2. Related Art

Recent electronic devices such as digital TVs have various functions in addition to their own functions, and thus user interfaces for controlling these various functions also become complicated and are diversified.

Although terminals capable of controlling the electronic devices including a remote controller are propagated, the terminals are difficult to efficiently control the various functions.

SUMMARY

An aspect of this document is to provide a mobile terminal, an electronic device and a method of controlling the electronic device easily and intuitively through a touch device included in the mobile terminal.

According to a first aspect of this document, there is provided a mobile terminal capable of communicating with an electronic device including a display, which comprises a touch device; a communication unit configured to communicate with the electronic device; and a controller configured to match a display area of the display and a touch area of the touch device to each other based on the absolute coordinate system and to transmit control information including position information about a second point of the display area, which corresponds to a first point touched through the touch area, to the electronic device through the communication unit.

According to a second aspect of this document, there is provided a mobile terminal capable of communicating with an electronic device including a display, which comprises a touch device; a communication unit configured to communicate with the electronic device; a sensing unit configured to sense the orientation of the touch device; and a controller configured to transmit control information including position information about a touched point in a touch area of the touch device and information about the current orientation of the touch device to the electronic device through the communication unit.

According to a third aspect of this document, there is provided an electronic device capable of communicating with a mobile terminal including a touch device, which comprises a display including a display area; a communication unit configured to communicate with the mobile terminal; and a controller configured to match the display area and a touch area of the touch device to each other based on the absolute coordinate system, to receive control information including information about a touched point in the touch area from the mobile terminal through the communication unit and to execute a function relating a point of the display area, which corresponds to the touched point of the touch area.

According to a fourth aspect of this document, there is provided a method of controlling an electronic device including a display through a mobile terminal capable of communicating the electronic device, the method comprising: matching a display area of the display and a touch area of a touch device included in the touch device to each other based on the absolute coordinate system; receiving a touch input applied to a first point included in the touch area; and transmitting control information including position information about a second point of the display area, which corresponds to the first point, to the electronic device.

According to a fifth aspect of this document, there is provided a method of controlling an electronic device including a display through a mobile terminal capable of communicating the electronic device, the method comprising: receiving a touch input applied to a point included in a touch area of a touch device included in the mobile terminal; acquiring information about the current orientation of the touch device; and transmitting control information including position information about the point and the information about the orientation to the electronic device.

According to a sixth aspect of this document, there is provided a method of controlling an electronic device capable of communicating with a mobile terminal including a touch device, the method comprising: matching a display area of a display included in the electronic device and a touch area of the touch device to each other based on the absolute coordinate system; receiving control information including information about a touched point of the touch area from the mobile terminal; and executing a function relating to a point of the display area, which corresponds to the touched point of the touch device.

According to the mobile terminal, the electronic device and the method of controlling the same of this document, a touch area of a touch device included in the mobile terminal and a display area of a display of the electronic device are matched to each other one to one, and thus the user can intuitively control the display area through the touch area.

Furthermore, a variation in the posture of the mobile terminal is automatically sensed and the posture variation is reflected in the matching relationship between touch area and the display area such that the user can maintain intuition.

BRIEF DESCRIPTION OF THE DRAWINGS

The implementation of this document will be described in detail with reference to the following drawings in which like numerals refer to like elements.

DETAILED DESCRIPTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

A system to which this document is applied may include an electronic device and a mobile terminal for controlling the electronic device. This document will be described on the assumption that the electronic device corresponds to a digital television receiver (DTV). However, the electronic device disclosed in this document is not limited to the DTV. For example, the electronic device may be a set-top box, an Internet protocol TV (IPTV), a personal computer or the like.

Figure 1:
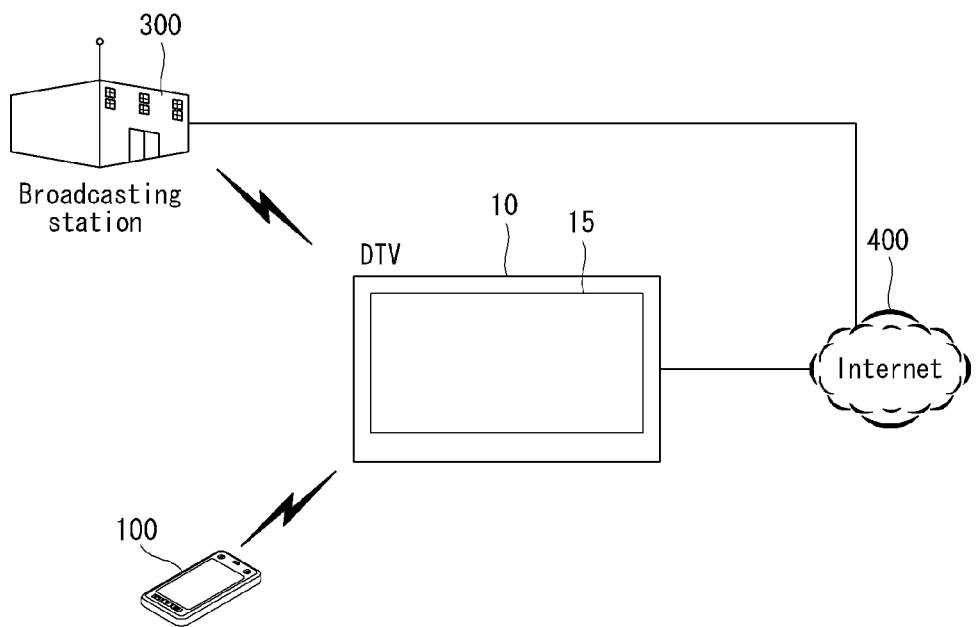
FIG. 1 illustrates a system to which this document is applied.

FIG. 1 illustrates the system to which this document is applied. Referring to FIG. 1, the system may include a DTV 10, a mobile terminal 100, a broadcasting station 300, and the Internet 400.

The DTV 10 may receive broadcasting signals from the broadcasting station 300 and output the broadcasting signals. The DTV 10 may include a device that can be linked to the Internet 400 according to transmission control protocol/Internet protocol (TCP/IP).

The DTV 10 and the mobile terminal 100 may be connected to each other in a wired manner and/or a wireless manner to transmit/receive data.

Figure 2:
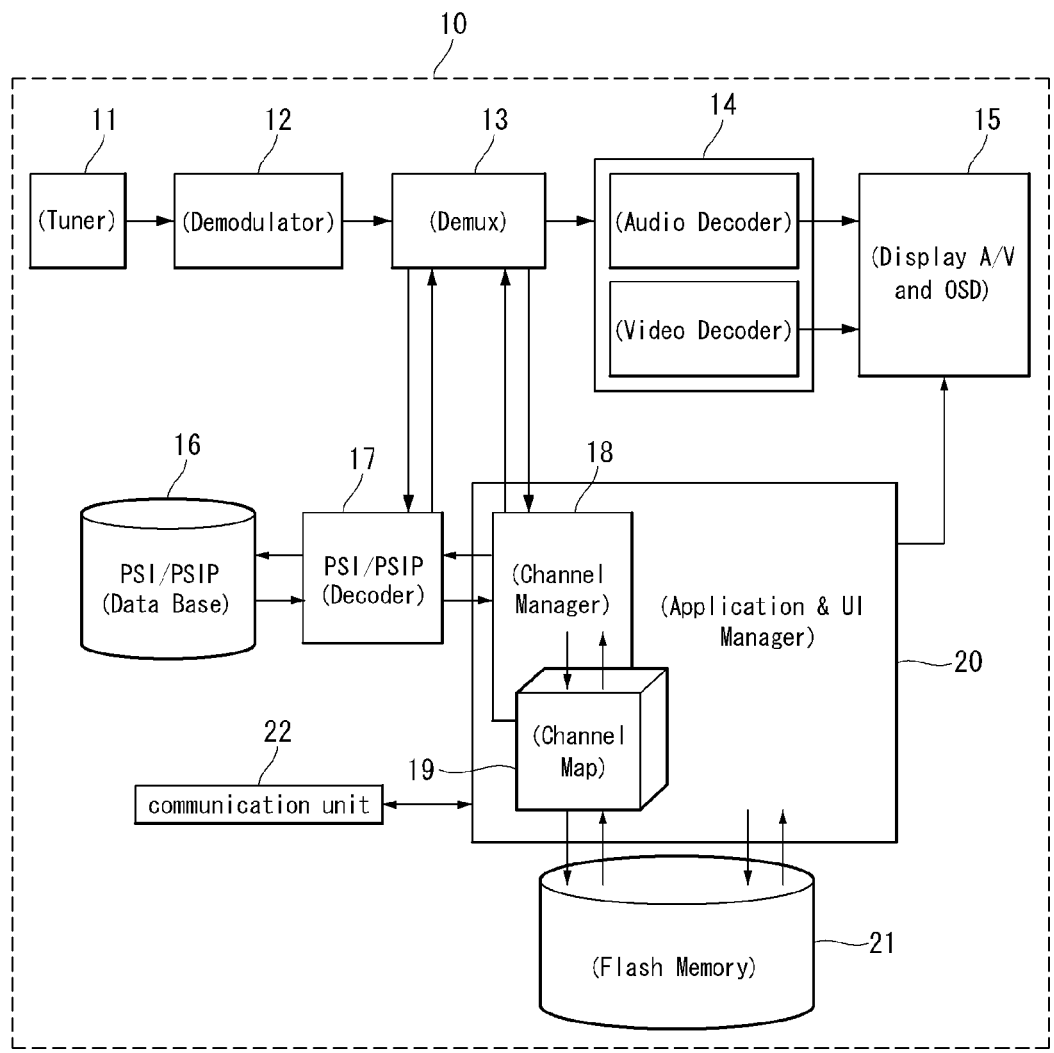
FIG. 2 is a block diagram of a DTV according to an embodiment of this document.

FIG. 2 is a block diagram of the DTV 10 shown in FIG. 1.

Referring to FIG. 2, the DTV 10 may include a tuner 11, a demodulator 12, a demultiplexer 13, an audio/video decoder 14, a display 15, a program and system information/program and system information protocol (PSI/PSIP) database 16, a PSI/PSIP decoder 17, a channel manager 18, a channel map 19, a controller 20, a flash memory 21, and a communication unit 22.

The tuner 11 may receive a digital broadcasting signal including a PSI/PSIP table. The operation of the tuner 11 may be controlled by the channel manager 18, and thus the digital broadcasting signal received by the tuner 11 is recorded in the channel manager 18. The tuner 11 may include multiple tuners to receive multiple channels.

The demodulator 12 receives a signal tuned by the tuner 11 and demodulates the signal into a vestigial side band/enhanced vestigial side band (VSB/EVSB) signal.

The demultiplexer 13 receives transmission packets demodulated by the demodulator 12 and demultiplexes the transmission packets into audio, video and PSI/PSIP table data. Here, the demultiplexing of the transmission data into the PSI/PSIP table data may be controlled by the PSI/PSIP decoder 17 and the demultiplexing of the transmission data into the audio and video data may be controlled by the channel manager 18.

When the PSI/PSIP decoder 17 sets PID for a desired table as a condition, the demultiplexer 13 generates PSI/PSIP table sections that satisfy the PID from the transmission packets and transmits the PSI/PSIP table sections to the PSI/PSIP decoder 17. In addition, when the channel manager 18 sets A/V PID of a virtual channel as a condition, the demultiplexer 13 demultiplexes A/V elementary streams and transmits the demultiplexed A/V elementary streams to the A/V decoder 14. The A/V decoder 14 decodes received broadcasting data according to a corresponding coding method.

The PSI/PSIP decoder 17 parses the PSI/PSIP table sections, reads all the remaining actual section data that is not filtered by the multiplexer 13 and records the actual section data in the PSI/PSIP database 16.

The channel manager 18 may request for channel related information table with reference to the channel map and receive the request result. Here, the PSI/PSIP decoder 17 multiplexes the channel related information table and transmits an A/V PDI list to the channel manager 18. The channel manager 18 may directly control the multiplexer 13 using the received A/V PID list so as to control the A/V decoder 14.

The controller 20 may control a graphical user interface (GUI) that on-screen-displays a state of a receiver system. In addition, the controller 20 controls the aforementioned components and handles the overall operation of the DTV 10.

The display 15 outputs broadcasting data output from the A/V decoder 14 as sounds and images. The display 15 may include physically logically separated display units. The display 15 may receive and output broadcasting data and have all of display functions of the conventional DTV. The display 15 may display data broadcast, teletext, caption, advertisements, etc., which are separated from the broadcasting data or separately received. In addition, the display 15 may display additional information including stock information and weather information and an instant message window.

The communication unit 22 may communicate with the mobile terminal 100. For example, the communication unit 22 can communicate with the mobile terminal 100 according to near field communication such as RF communication, infrared-ray communication and Bluetooth. However, the communication method between the mobile terminal 100 and the DTV 10 is not limited thereto.

Figure 3:
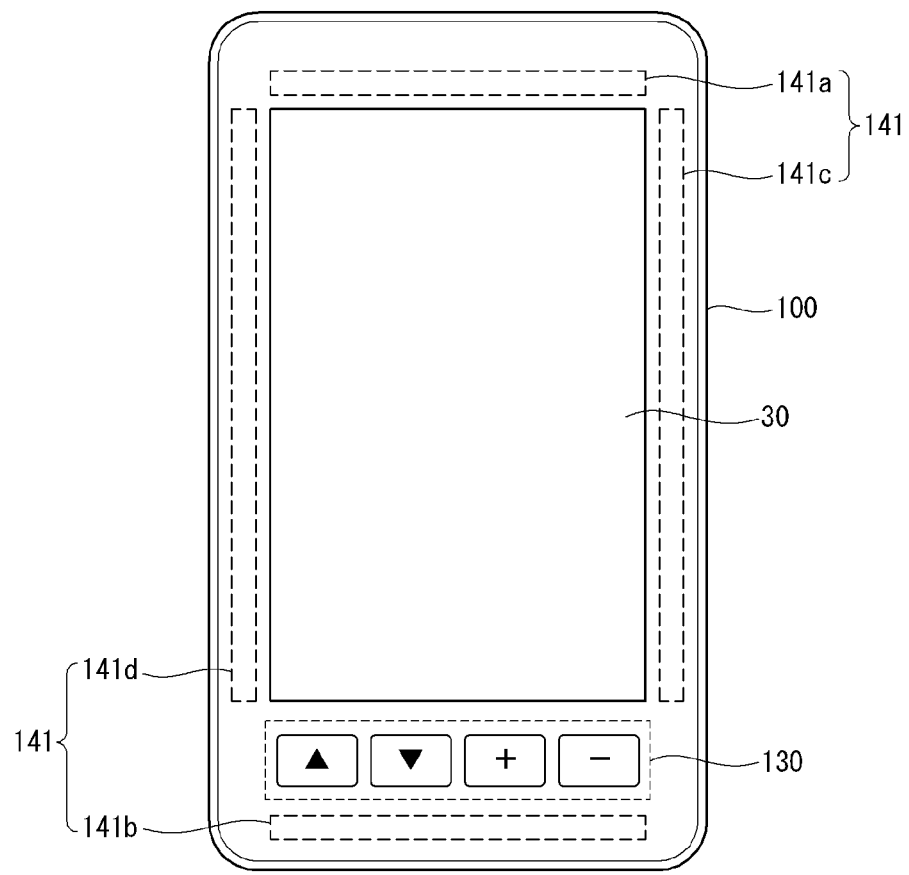
FIG. 3 illustrates the external appearance of a mobile terminal 100 according to an embodiment of this document.
Figure 4:
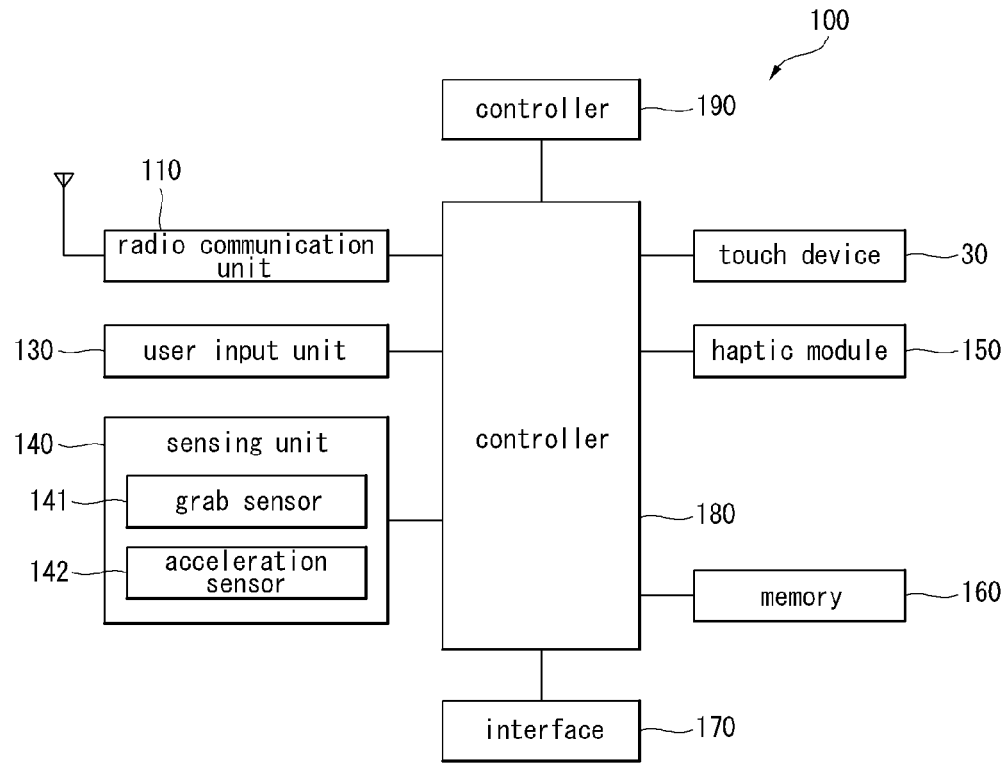
FIG. 4 is a block diagram of the mobile terminal 100 shown in FIG. 3.

FIG. 3 illustrates the external appearance of the mobile terminal 100 shown in FIG. 1 and FIG. 4 is a block diagram of the mobile terminal 100 shown in FIG. 3. The mobile terminal 100 will now be explained in detail with reference to FIGS. 3 and 4.

The mobile terminal 100 may include a touch device 30, a radio communication unit 110, a user input unit 130, a sensing unit 140, a haptic module 150, a memory 160, an interface 170, a controller 180, and a power supply 190. The components of the mobile terminal 100 are not limited to those shown in FIG. 4, and thus the mobile terminal 100 may include a number of components greater or smaller than the number of the components shown in FIG. 4.

The touch device 30 includes a sensor sensing a touch operation (referred to as 'touch sensor' hereinafter). The touch sensor may have a form of touch film, touch sheet, touch pad or the like.

The touch sensor may be configured to convert a variation in the pressure applied to a specific point of the touch device 30 or a variation in the capacitance generated at a specific point of the touch device 30 into an electric input signal. The touch sensor may sense touch pressure as well as a touched point and area.

When a touch input is applied to the touch sensor, a signal (or signals) corresponding to the touch input is sent to a touch controller. The touch controller processes the signal (or signals) and transmits data corresponding to the touched signal (or signals) to the controller 180 such that the controller 180 can recognize which region of the touch device 30 is touched.

The touch device 30 may include a display. In this case, the touch device 30 can function as a display device as well as an input device.

The radio communication unit 110 may include at least one module that enables radio communication between the mobile terminal 100 and a radio communication system, between the mobile terminal 100 and a network including the mobile terminal 100 is located or between the mobile terminal 100 and the DTV 10. For example, the radio communication unit 110 can include a mobile communication module, a wireless Internet module and a near-field communication module.

The mobile communication module transmits/receives radio signals to/from at least one of a base station on a mobile communication network, an external terminal and a server. The radio signals may include voice call signals, video telephony call signals, and data in various forms according to text/multimedia message transmission/reception.

The wireless Internet module is used for wireless Internet access and may be built in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA), etc. may be used as a wireless Internet technique.

The short-range communication module means a module for near field communication. Bluetooth, radio frequency identification (RFID), infrared data association (IrDA), ultra wideband (UWB) and ZigBee may be used as a near field communication technique.

The user input unit 130 receives input data for controlling the operation of the mobile terminal 100 from a user. The user input unit 130 may include a keypad, a dome switch, a touch pad (constant voltage/capacitance), a jog wheel, a jog switch, etc.

The sensing unit 140 senses the current state of the mobile terminal 100, such as open/close state of the mobile terminal 100, the position of the mobile terminal 100, whether or not the user touches the mobile terminal 100, the orientation of the mobile terminal 100 and acceleration/deceleration of the mobile terminal 100, and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether or not the power supply 190 supplies power and whether or not the interface 170 is connected to an external device. The sensing unit 140 may include a proximity sensor.

In addition, the sensing unit 140 may include at least one of a grab sensor 141 and an acceleration sensor 142. The grab sensor 141 may be arranged to sense an external object's contact point on the body of the mobile terminal 100. For example, the grab sensor 141 can include first, second, third and fourth grab sensors 141a, 141b, 141c and 141d respectively arranged in regions corresponding to four sides of the touch device 30, as shown in FIG. 3. However, the arrangement of the grab sensor 141 is not limited to that shown in FIG. 3. The grab sensor 141 may be arranged in different manners and the number of sensors included in the grab sensor 141 may be changed. For example, when the user grabs the right side of the mobile terminal 100 with his/her right hand, the third grab sensor 141c can sense the grab and transmit a signal corresponding to the grab to the controller 180.

The acceleration sensor 142 may be a 3-axis accelerometer.

The haptic module 150 generates various haptic effects that the user can feel. A representative example of the haptic effects is vibration. The intensity and pattern of vibration generated by the haptic module 154 can be controlled. For example, different vibrations can be combined and output or sequentially output.

The haptic module 150 can generate a variety of haptic effects including an effect of stimulus according to the arrangement of pins vertically moving for a contact skin face, an effect of stimulus according to a jet force or a sucking force of air through a jet hole or a sucking hole, an effect of stimulus rubbing the skin, an effect of stimulus according to the contact of an electrode, an effect of stimulus using electrostatic force and an effect according to reproduction of cold and warmth using an element capable of absorbing or radiating heat in addition to vibrations.

The haptic module 150 may not only transmit haptic effects through direct contact but also allow the user to feel haptic effects through kinesthetic sense of his/her fingers or arms. The mobile terminal 100 may include at least two haptic modules 150 according to the configuration of the mobile terminal.

The memory 160 may store a program for the operation of the controller 180 and temporarily store input/output data (for example, phone book, messages, still images, moving images, etc.). The memory 160 may store data about vibrations and sounds in various patterns, which are output when a touch input is applied to the touch device 30.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk. The mobile terminal 100 may operate in relation to a web storage performing the storing function of the memory 160 on the Internet.

The interface 170 serves as a path to all of external devices connected to the mobile terminal 100. The interface 170 receives data or power from the external devices and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as signals for confirming whether the mobile terminal 100 is correctly set in the cradle.

The controller 180 controls the overall operation of the mobile terminal 100. For example, the controller 180 performs control and processing for voice communication, data communication and video telephony. The controller 180 may include a multimedia module for playing multimedia. The multimedia module may be included in the controller 180 or separated from the controller 180.

The power supply 190 receives external power and internal power and provides power required for the operations of the components of the mobile terminal under the control of the controller 180.

Various embodiments of this document can be implemented in a computer or similar device readable recording medium using software, hardware or a combination thereof, for example.

According to hardware implementation, the embodiments of this document can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Various embodiments of this document will now be explained in detail.

As described above, the mobile terminal 100 and the DTV 10 can be connected to each other in a wired or wireless manner. The mobile terminal 100 can be used as a remote controller for controlling the DTV 10. However, the mobile terminal 100 is not limited to the conventional remote controller.

The mobile terminal 100 disclosed in this document can include any electronic device capable of communicating with the DTV 10. For example, the mobile terminal 100 can include a remote controller, a cellular phone, a smart phone, a laptop computer, a digital broadcasting terminal, personal digital assistants (PDA), a navigation system, etc.

Figure 5:
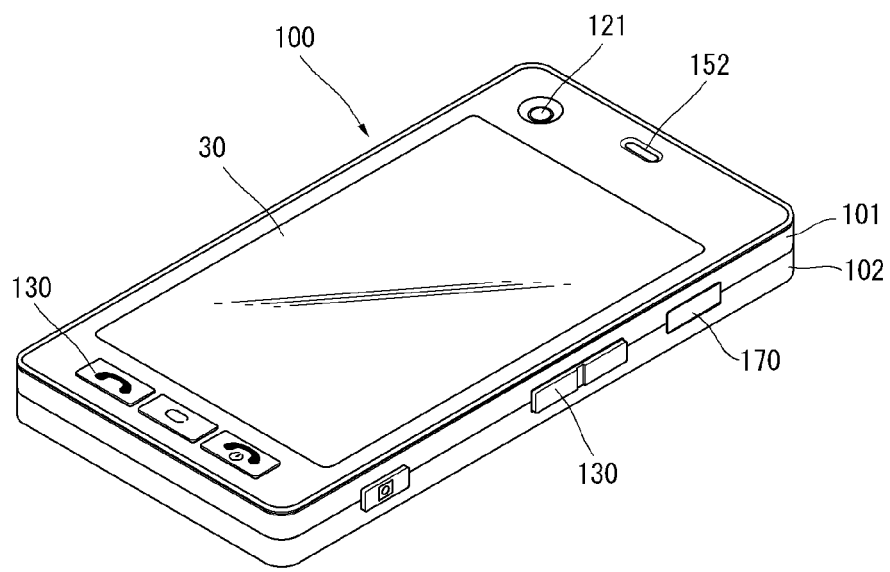
FIG. 5 illustrates the external appearance of a cellular phone as an example of the mobile terminal 100 of this document.

FIG. 5 illustrates the external appearance of a cellular phone as an example of the mobile terminal 100.

The display 15 included in the DTV 10 shown in FIG. 1 includes a display area displaying contents. The touch device 30 included in the mobile terminal 100 includes a touch area. The display area may correspond to the overall or part of the display 15 and the touch area may correspond to the overall or part of the touch device 30.

Figure 6:
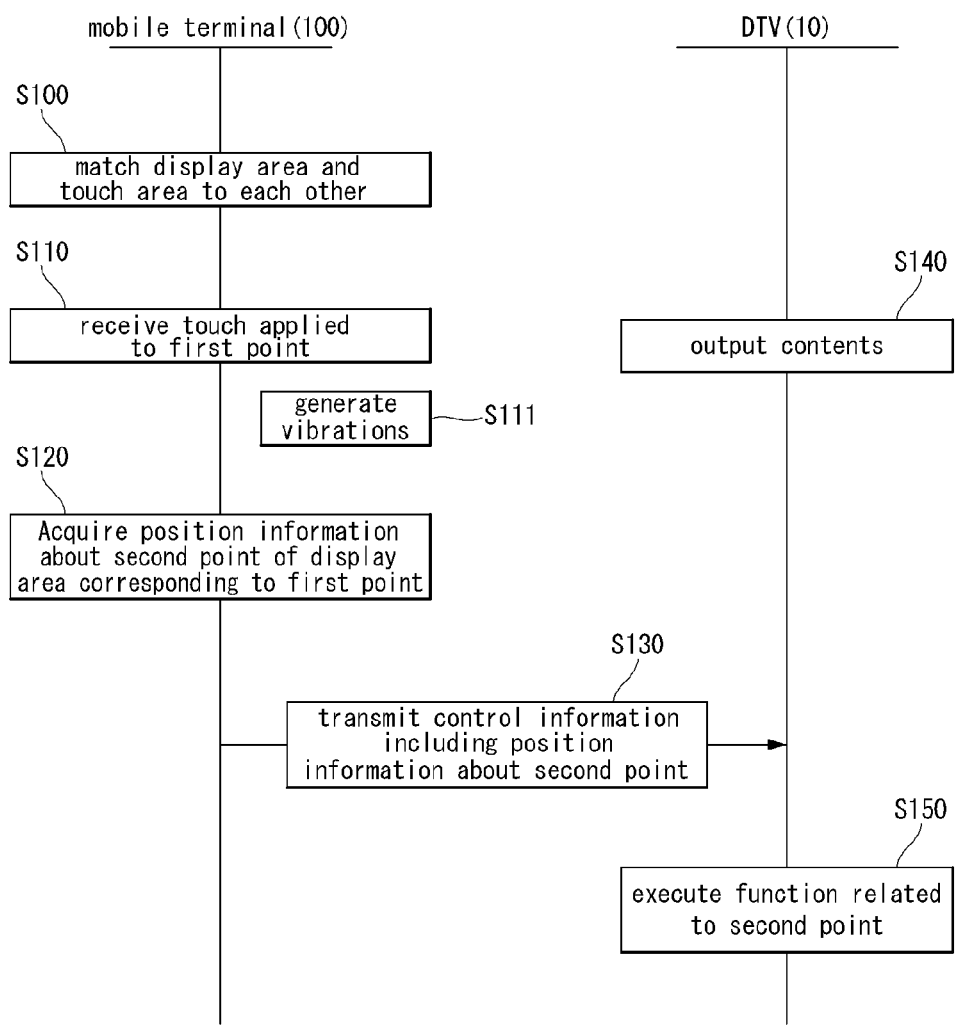
FIG. 6 is a flowchart illustrating a method of controlling a DTV according to an embodiment of this document.

FIG. 6 is a flowchart of a method of controlling a DTV according to an embodiment of the present invention. The method of controlling a DTV may be implemented in the DTV 10 and the mobile terminal 100 described with reference to FIGS. 1 through 5. The method of controlling a DTV according to an embodiment of the present invention and operations of the DTV 10 and the mobile terminal 100 to implement the method will now be explained in detail with reference to the attached drawings.

The mobile terminal 100 matches the display area of the display 15 of the DTV 10 and the touch area of the touch device 300 to each other such that the display area and the touch area correspond to each other based on the absolute coordinate system in operation S100.

The mobile terminal 100 may store resolution information of the display 15 of the DTV 10 or the display area in the memory 160. In addition, the mobile terminal 100 may receive the resolution information of the display 15 or the display area from the DTV 10.

Figure 7:
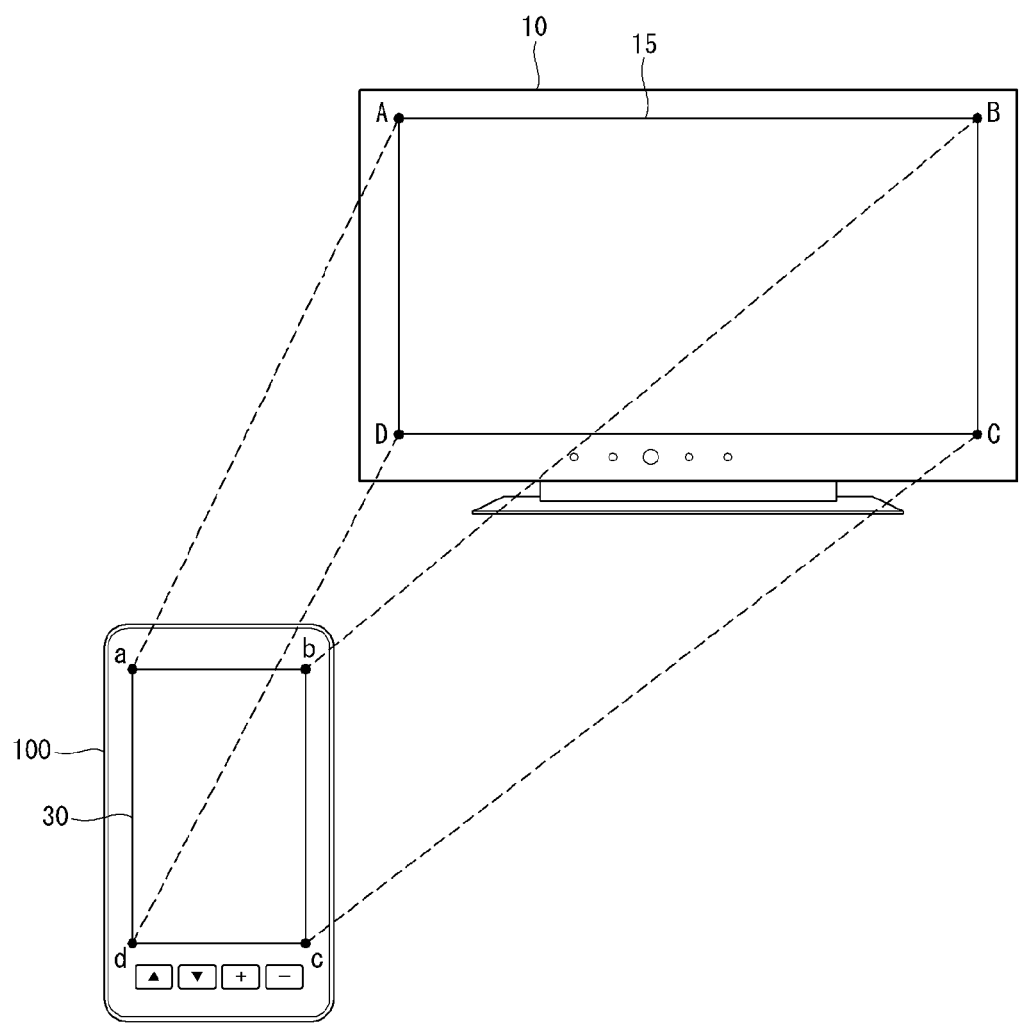
FIG. 7 is illustrates an example of matching a display area and a touch area to each other.

FIG. 7 illustrates an example of matching the display area and the touch area to each other. In FIG. 7, the whole display 15 corresponds to the display area and the whole touch device 30 corresponds to the touch area. Otherwise, the display area may correspond to part of the display 15 and the touch area may correspond to part of the touch device 30.

Referring to FIG. 7, the mobile terminal 100 matches the display area 15 to the touch area 30 such that points A, B, C and D of the display 15 are respectively correspond to points a, b, c and d of the touch area 30. Accordingly, the points A, B, C and D of the display 15 are one-to-one correspond to the points a, b, c and d of the touch area 30.

The memory 160 included in the mobile terminal 100 can store information about the matching relationship between the touch area 30 and the display area 15.

The mobile terminal 100 receives a touch applied to a first point on the touch area 30 in operation S110. As the touch area 30 is touched, the mobile terminal 100 may control the haptic module 150 to generate vibrations in operation S111.

The controller 180 of the mobile terminal 100 may acquire position information about a second point on the display area 15, which corresponds to the touched first point on the touch area 30 in operation S120. The controller 180 of the mobile terminal 100 may perform the operation S120 according to the matching relationship made in the operation S110.

Figure 8:
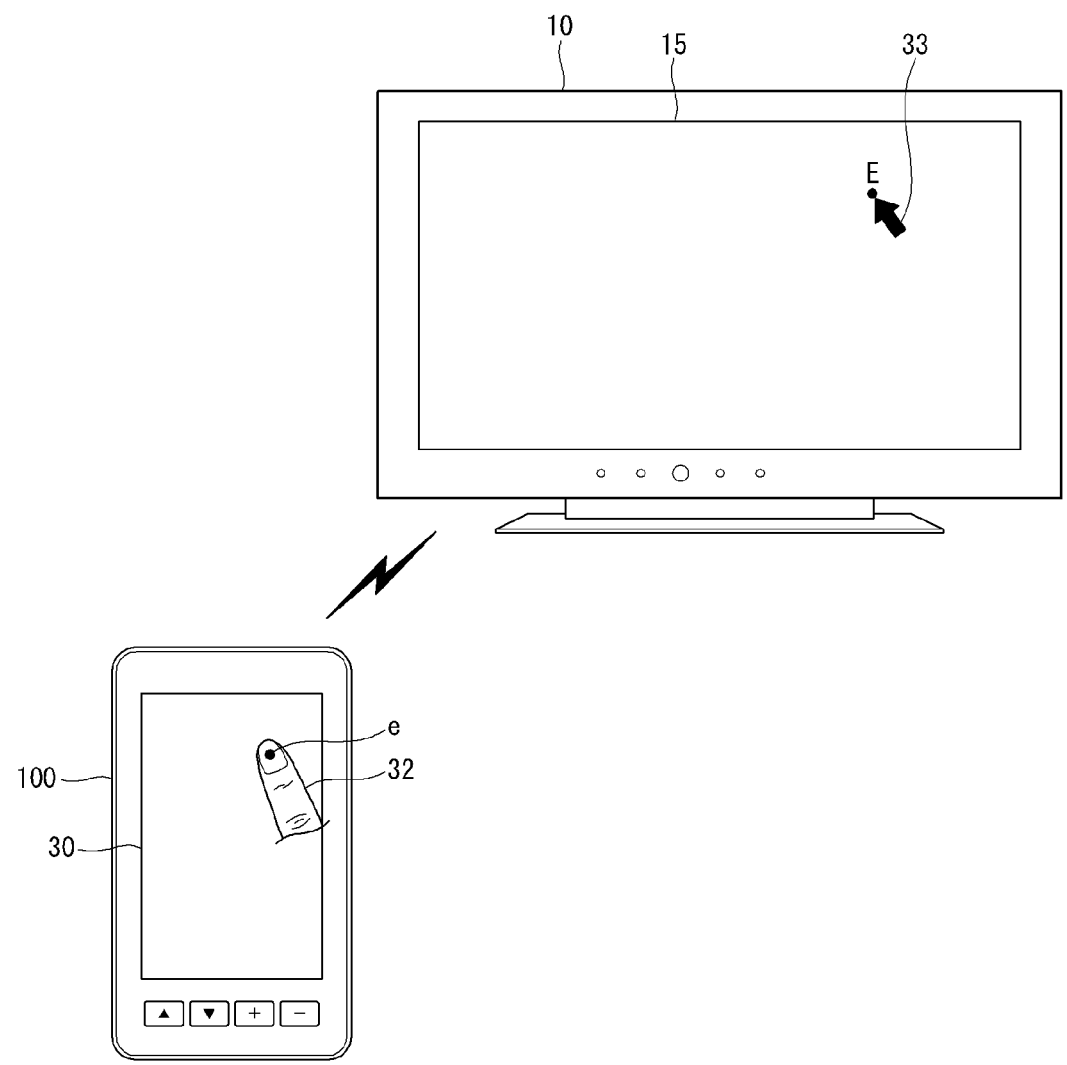
FIG. 8 is a view for explaining one-to-one correspondence of the touch area and the display area shown in FIG. 7.

FIG. 8 is a view for explaining the one-to-one correspondence of the touch area 30 and the display area 15. Referring to FIG. 8, a point e (first point) on the touch area 30, touched by an external object 32, may correspond to a specific point E (second point) on the display area 15. Accordingly, the controller 180 can acquire position information of the point E on the display area 15 when the external object 32 touches the point e on the touch area 30. The position information of the point E may include the coordinate value of the point E on the display area 15.

The mobile terminal 100 transmits control information including the position information of the second point to the DTV 10 in operation S130.

The DTV 10 may output specific contents in operation S140. For example, the DTV 10 can display the specific contents on the display 15.

The contents output from the DTV 10 may include a still image, a moving image, a text and an object. For example, the contents can be a picture, a broadcasting program, music or a movie and the object can be a user interface, a graphical user interface or an icon.

The DTV 10 receives the control information from the mobile terminal 100 and executes a function related to the second point according to the position information of the second point, included in the received control information in operation S150. The function related to the second point may include various functions. For example, the function related to the second point can include at least one of a function of locating a pointer on the second point, a function of selecting an icon placed on the second point and a function of executing the icon.

Referring to FIG. 8, when the external object 32 touches the point e on the touch area 30, the controller 20 of the DTV 10 can display a pointer 33 on the specific point E on the display area 15, which is corresponds to the touched point e on the touch area 30.

The mobile terminal 100 can acquire information on the intensity of the touch. In addition, the mobile terminal 100 can transmit the control information including the information on the intensity of the touch to the DTV 10.

The DTV 10 can perform a function according to the intensity of the touch when the control information includes the information on the intensity of the touch.

If a specific icon is located on the point corresponding to the position information included in the control information received from the mobile terminal 100, the DTV 10 selects the specific icon when the intensity of the touch, included in the control information, is lower than a reference value and executes a specific function corresponding to the specific icon when the intensity of the touch is higher than the reference value. That is, the user can select the specific icon by lightly touching the point on the touch area 30, which corresponds to the point on which the specific icon is located, or execute a function corresponding to the specific icon by strongly touching the point.

Figure 9:
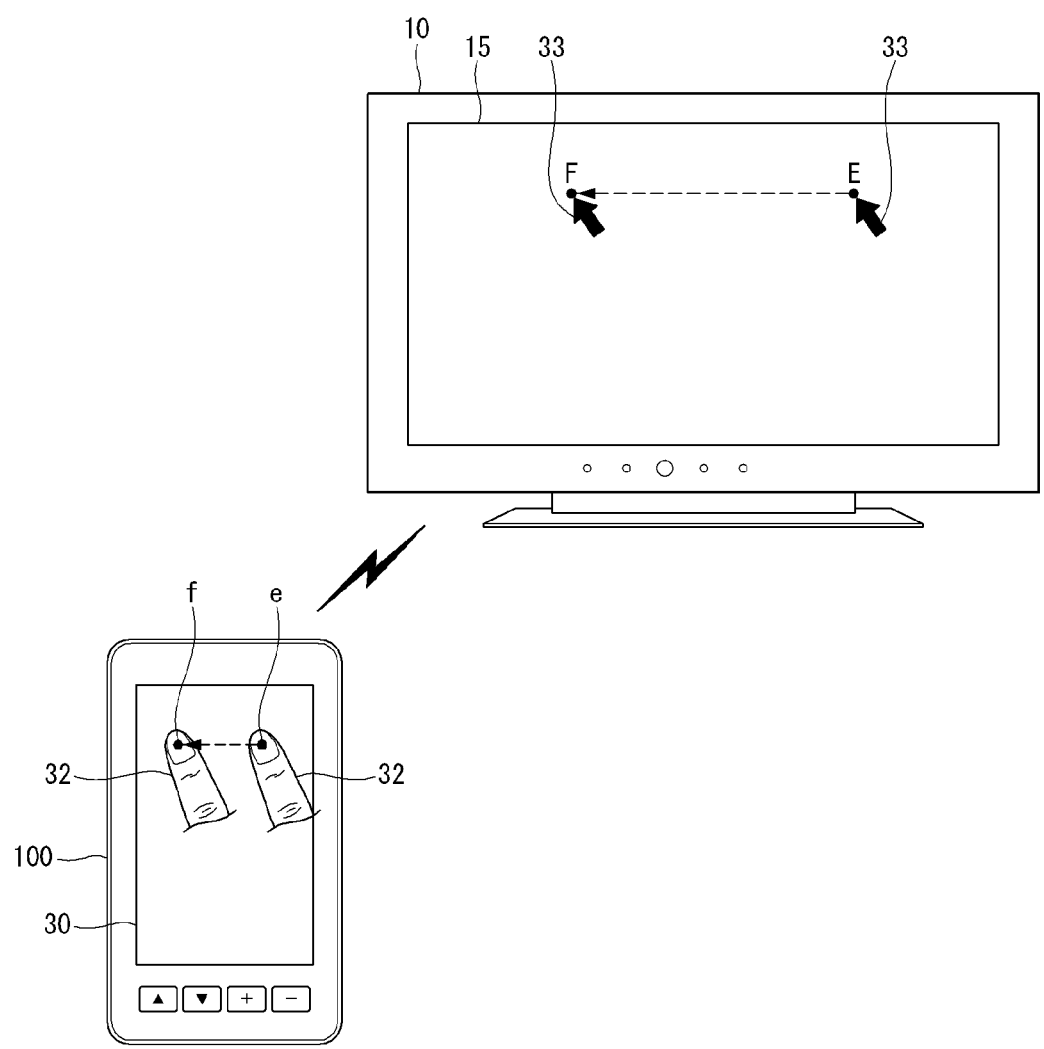
FIG. 9 illustrates an exemplary operation of controlling a pointer displayed on the display area.

FIG. 9 illustrates an example of controlling the pointer 33 indicated on the display area 15.

Referring to FIG. 9, when the user touches the first point e with his/her finger, the mobile terminal 100 acquires position information about the second point E on the display area 30, which corresponds to the first point e, and transmits the position information to the DTV 10. The DTV 10 locates the pointer 33 on the second point E. Then, if the user drags his/her finger 32 from the first point e to a third point f, the mobile terminal 100 transmits information about the dragging operation to the DTV 10. The DTV 10 receives the control information about the dragging operation from the mobile terminal 100 and moves the pointer 33 to a fourth point F corresponding to the second point f on the touch area 30.

Meantime, the controller 180 of the mobile terminal 100 can consider the orientation of the touch device 30 when performing the operation S100.

Figure 10:
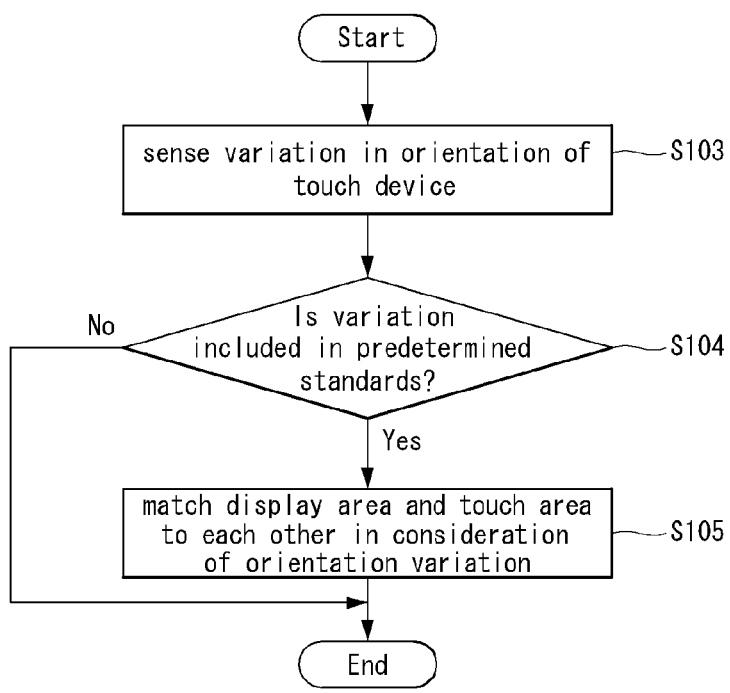
FIG. 10 is a flowchart illustrating operation S100 shown in FIG. 6, performed in consideration of the orientation of a touch device 30.

FIG. 10 is a flowchart showing the operation S100 carried out in consideration of the orientation of the touch device 30.

Referring to FIG. 10, the controller 180 senses a variation in the orientation of the touch device 30 in operation S103. The sensing unit 140 included in the mobile terminal 100 can acquire information about the orientation of the touch device 30 such as a variation in the orientation of the touch device 30.

Figure 11:
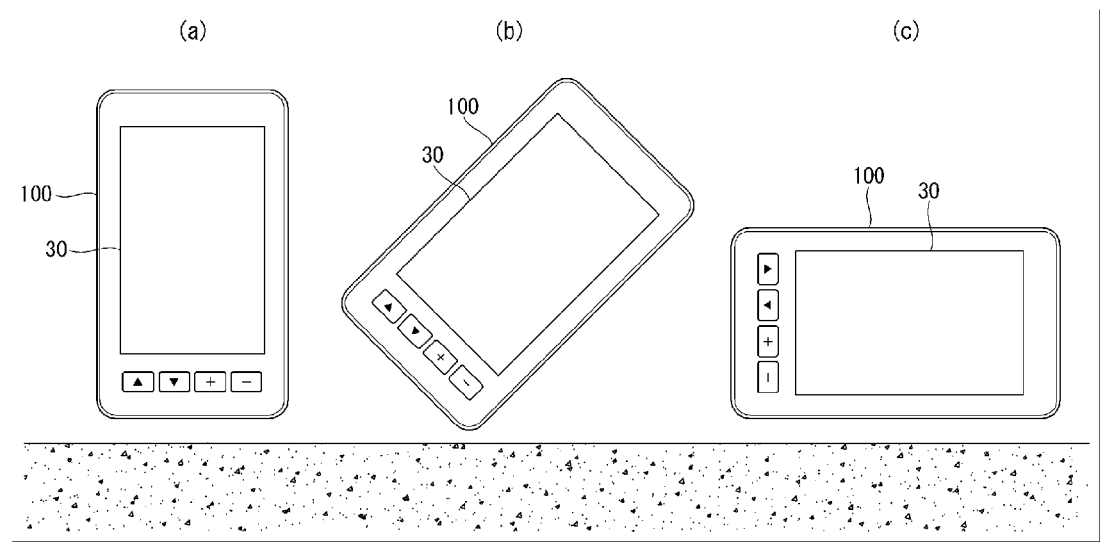
FIG. 11 is a view for explaining a variation in the orientation of the touch device 30.

FIG. 11 is a view for explaining a variation in the orientation of the touch device 30. FIG. 11(a) shows the touch device 30 when located in portrait mode, FIG. 11(b) shows the touch device 300 when tilted, and FIG. 11(c) shows the touch device 30 when located in landscape mode.

The sensing unit 140 can acquire the information about the orientation of the touch device 30 in various manners. For example, the sensing unit 140 can sense rotation of the touch device 30 on an axis perpendicular to the surface of the touch device 30 using the acceleration sensor 142.

If the user tilts the mobile terminal 100 in the state shown in FIG. 11(a) to the state shown in FIG. 11(c), the controller 180 can sense the tilting through the acceleration sensor 142 and recognize that the touch device 30 has been changed from portrait mode to the landscape mode.

Furthermore, the sensing unit 140 can acquire the information about the orientation of the touch device 30 using the grab sensor 141.

Figure 12:
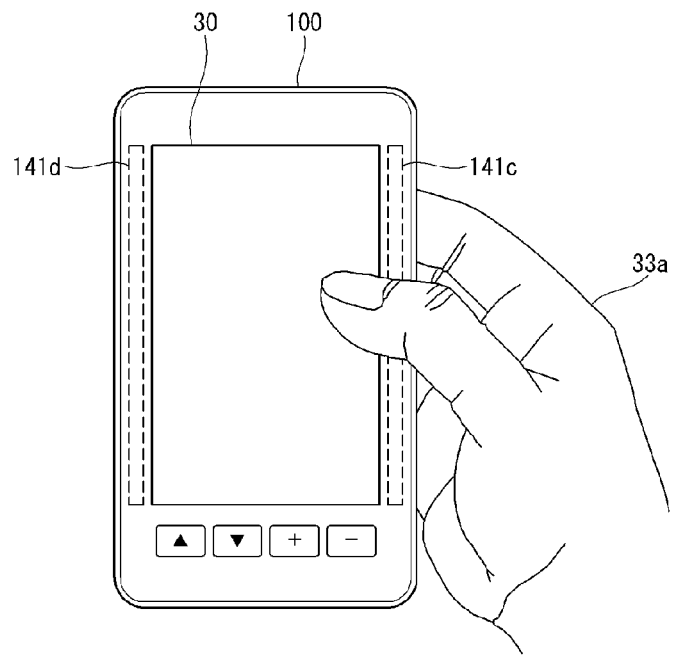
FIGS. 12 and 13 illustrate an operation of acquiring information about the orientation of the touch device 30 using a grab sensor 141.
Figure 13:
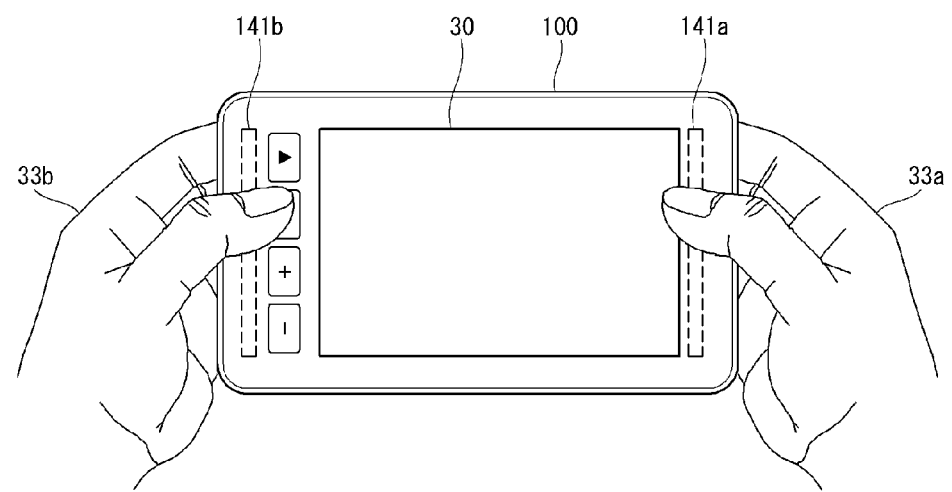

FIGS. 12 and 13 are views for explaining a method of acquiring the information about the orientation of the touch device 30 using the grab sensor 141.

Referring to FIG. 12, the user grabs a portion of the mobile terminal 100, which corresponds to the third grab sensor 141c, with his/her right hand 33a. The controller 180 can receive a signal from the third grab sensor 141c and recognize that the touch device 30 is located in portrait mode.

Referring to FIG. 13, the user grabs a portion of the mobile terminal 100, which corresponds to the first grab sensor 141a, with his/her right hand 33a and grabs a portion of the mobile terminal 100, which corresponds to the second grab sensor 141b, with his/her left hand 33b. The controller 180 can receive signals from the first and second grab sensors 141a and 141b and recognize that the touch device 30 is located in landscape mode. In addition, the controller 180 can acquire the information about the orientation of the touch device 30 using both the grab sensor 141 and the acceleration sensor 142. Here, the controller 180 uses one of the grab sensor 141 and the acceleration sensor 142 as main means and uses the other as supplementary means to acquire the information about the orientation of the touch device 30. Otherwise, the controller 180 can acquire the information about the orientation of the touch device 30 using one of the grab sensor 141 and the acceleration sensor 142 according to circumstances without giving priority to the grab sensor 141 and the acceleration sensor 142.

For example, the controller 180 may not acquire correct information about the orientation of the touch device 30 only using information received from the acceleration sensor 142 if the mobile terminal 100 is located in the state shown in FIG. 11(b). Here, the controller 180 can acquire the correct information about the orientation of the touch device 30 using information transmitted from the grab sensor 141.

The controller 180 determines whether the orientation variation sensed in the operation S103 is included in predetermined standards in operation S104 and matches the display area 15 and the touch area 30 to each other based on the absolute coordinate system in consideration of the changed orientation in operation S105 when the orientation variation is included in the predetermined standards.

For example, a change from the state shown in FIG. 11(a) to the state shown in FIG. 11(b) may not be included in the predetermined standards and a change from the state shown in FIG. (a) to the state shown in FIG. 11(c) may be included in the predetermined standards. The following embodiments will be described on the assumption that the predetermined standards include the portrait mode shown in FIGS. 11(a) and 12 and the landscape mode shown in FIGS. 11(c) and 13. However, the predetermined standards are not limited to the portrait and landscape modes.

Figure 14:
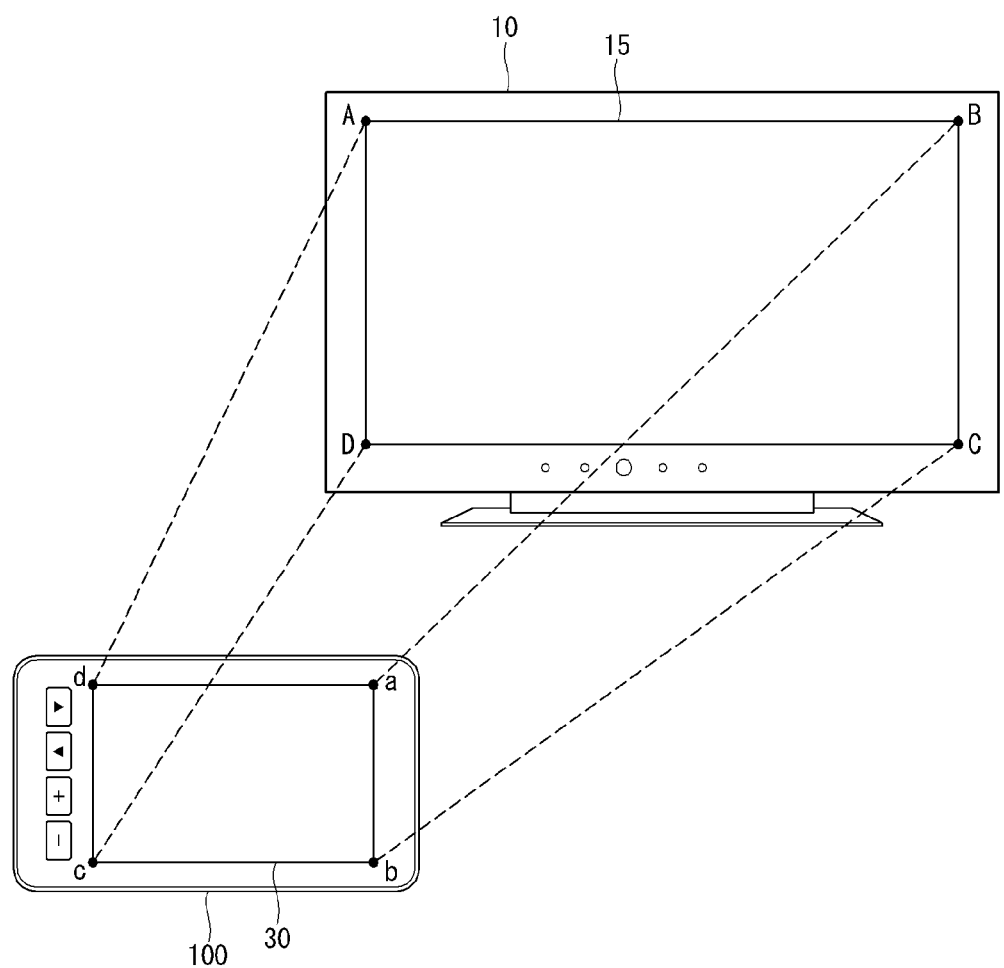
FIG. 14 illustrates another example of the one-to-one correspondence of the touch area and the display area.

FIG. 14 is a view for explaining an example of the matching relationship between the touch area 30 and the display area 15. FIG. 14 shows the matching relationship between the touch area 30 and the display area 15 when the touch device 30 is located in portrait mode.

When the orientation of the touch device 30 is changed from portrait mode to landscape mode, the controller 180 of the mobile terminal 100 may match the touch area 30 and the display area 15 to each other one to one such that points a, b, c and d of the touch area 30 respectively correspond to points B, C, D and A of the display area 15, as shown in FIG. 14.

Figure 15:
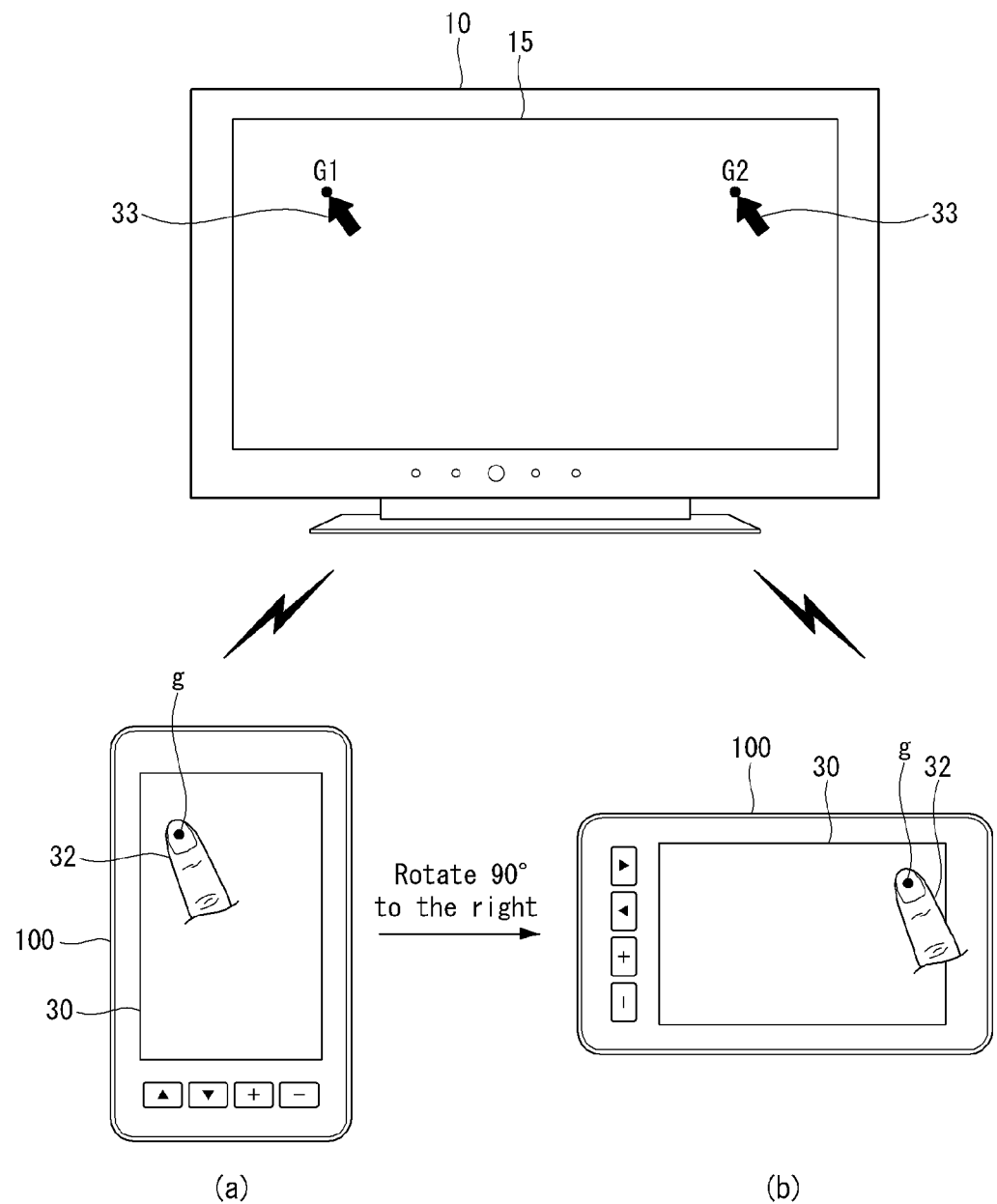
FIG. 15 is a view for explaining a variation in the control operation of the DTV shown in FIG. 2 according to a change in the orientation of the touch device 30.

FIG. 15 is a view for explaining a variation in the control operation of the DTV 10 according to a variation in the orientation of the touch device 30. FIG. 15(a) shows the touch device 30 when located in portrait mode and FIG. 15(b) shows the touch device 30 located in landscape mode. A touched point g shown in FIG. 15(a) and a touched point g shown in FIG. 15(b) are physically identical.

When the user touches the point g on the touch device 30 being in the sate shown in FIG. 15(a) with his/her finger 32, the DTV 10 can display the pointer 33 on a point G1 corresponding to the touched point g. When the user touches the point g on the touch device 30 being in the state shown in FIG. 15(b) with his/her finger 32, the DTV 10 can display the pointer 33 on a point G2 corresponding to the touched point g.

That is, the mobile terminal 100 can automatically generate different position information signals respectively corresponding to points on the touch device 30 even when the points are physically identical and transmit the different position information signals to the DTV 10 when the orientation of the touch device 30 is changed.

Accordingly, the user can use the touch device 30 as if he/she touches the display area 15 in an intuitive manner for the current orientation of the mobile terminal 100 or the touch device 30, as shown in FIG. 15.

Figure 16:
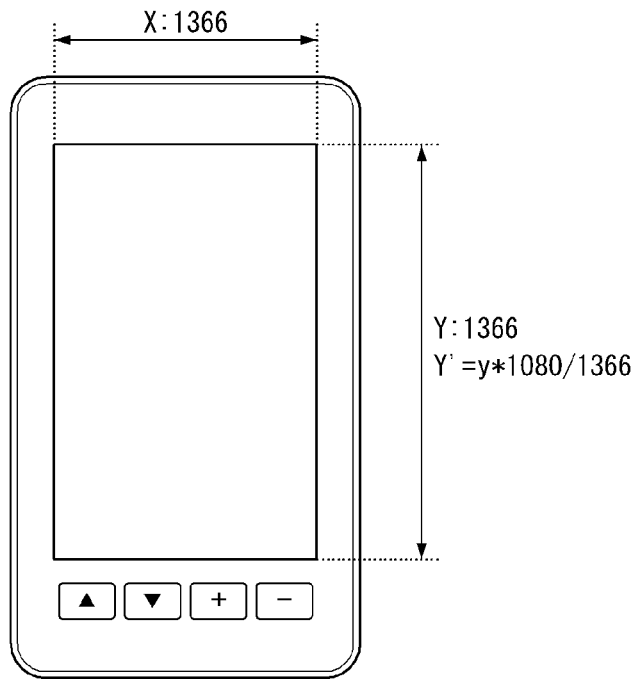
FIGS. 16 and 17 are views for explaining a method of one-to-one matching the touch area and the display area.
Figure 17:
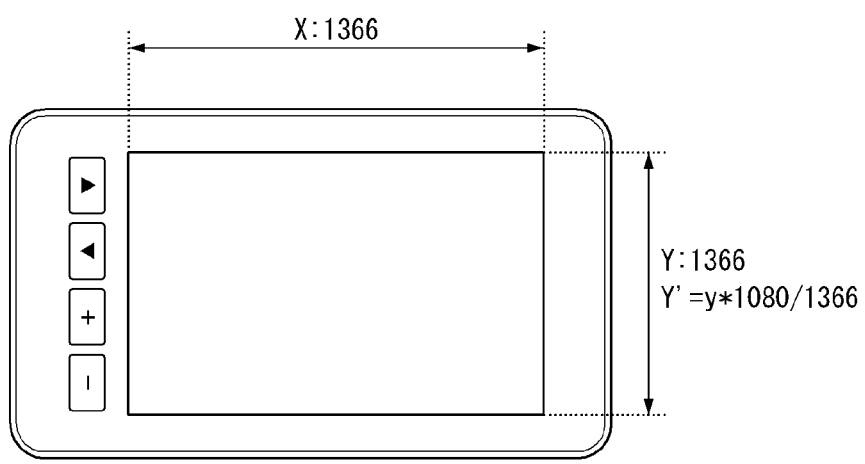

FIGS. 16 and 17 are views for explaining the method of matching the touch area 30 and the display area 15 to each other one to one in more detail. It is assumed that the touch area 30 has a resolution of 1,366×1,366 and the display area 15 of the DTV 10 has a resolution of 1,366×1,080.

When the touch device 30 is in portrait mode, as shown in FIG. 16, the touch area 30 has a resolution of 1,366 on the X axis and has a resolution of 1,080 on the Y axis. When the touch device 30 is in landscape mode, as shown in FIG. 17, the touch area 30 and the display area 15 are matched to each other in the same manner as that shown in FIG. 16.

The controller 180 of the mobile terminal 100 may consider a variation in the size of the display area of the display 15 or a variation in the resolution of the display area of the display 15 when performing the operation S100.

As described above, the DTV 10 can set the whole or part of the display 15 as the display area.

Figure 18:
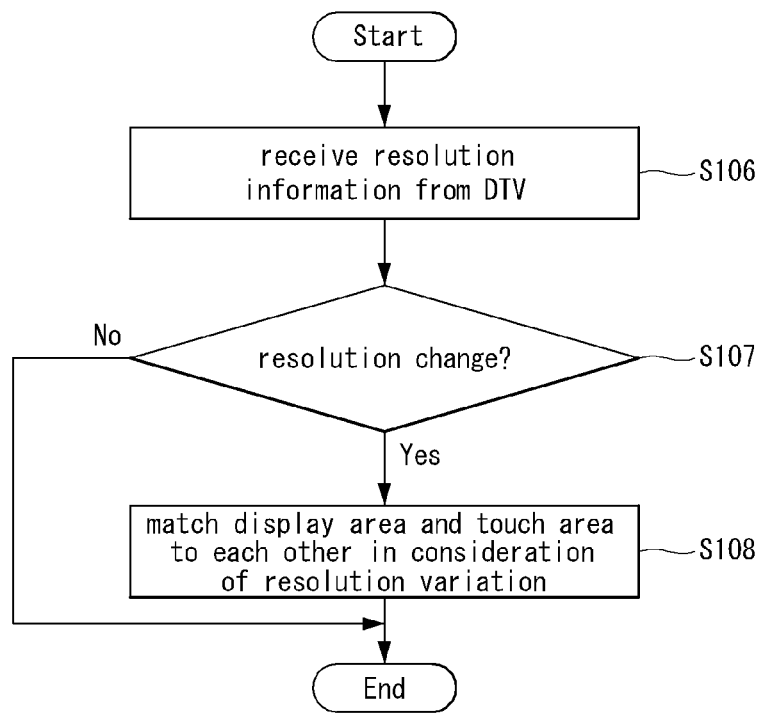
FIGS. 18 and 19 are views for explaining a case that parts of a display unit are set as a display area.
Figure 19:
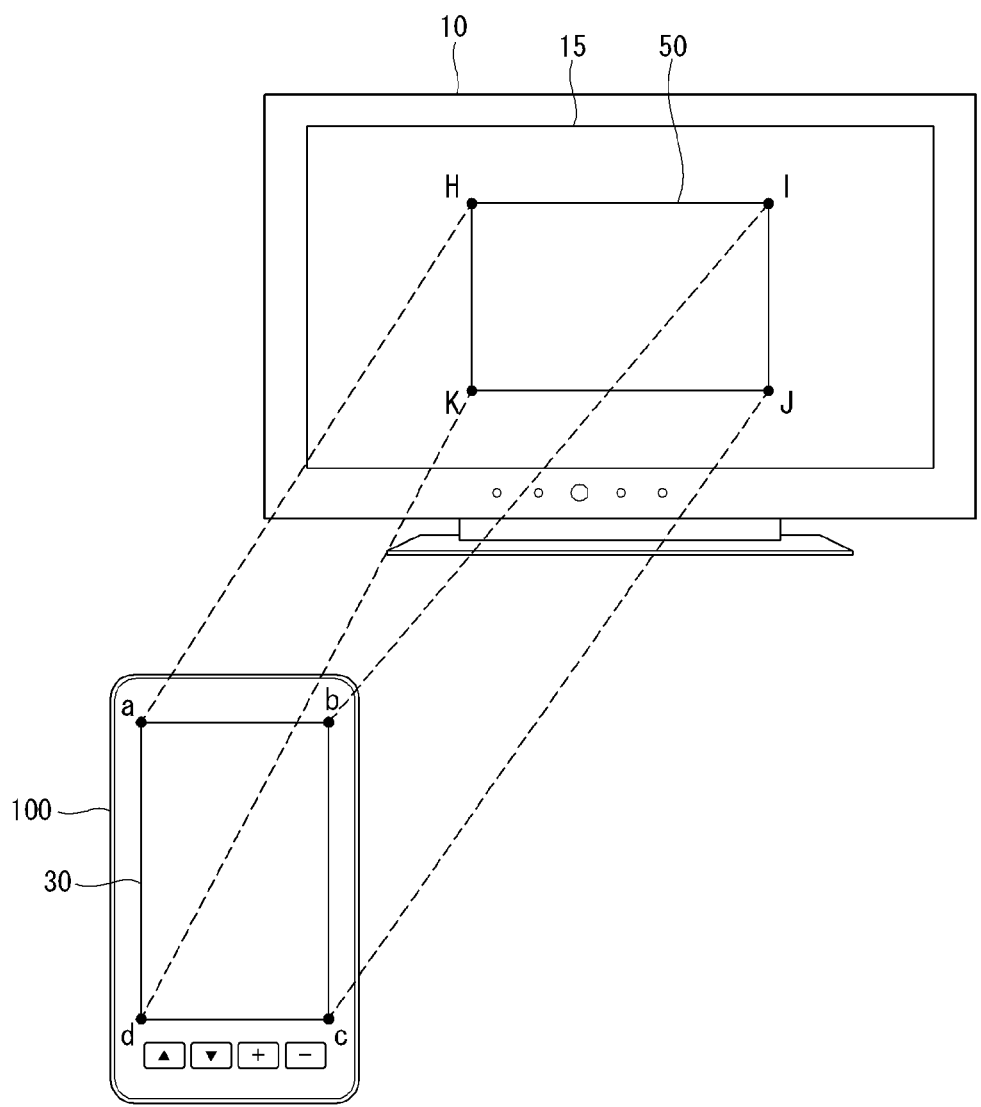

FIGS. 18 and 19 are views for explaining the case that part of the display 15 is set as the display area. For example, the DTV 10 can set part 50 of the display 15 as the display area, as shown in FIG. 19, at the request of the user or according to the resolution of contents. When the part of the display 15 is set as the display area 50, the touch area 30 of the mobile terminal 100 can be set to correspond to the display area 50.

Referring to FIG. 18, the controller 180 of the mobile terminal 100 may receive information about the resolution of contents displayed on the display 15 from the DTV 10 in operation S106. The controller 180 determines whether the received resolution information has been changed from previously stored resolution information in operation S107.

Referring to FIG. 19, the DTV 10 outputs the contents through the display area 50 corresponding to part of the display 15. Here, the mobile terminal 100 may receive information on the resolution of the display area from the DTV 10 and recognize that the received resolution information has been changed from the resolution of the whole display 15.

When the controller 180 determines that the received resolution information has been changed in operation S170, the controller 180 matches the display area 50 and the touch area 30 to each other base on the absolute coordinate system in consideration of the changed resolution in operation S108.

Referring to FIG. 19, the controller 180 can match the touch area 30 and the display area 50 to each other such that points a, b, c and d of the touch area 30 respectively correspond to points H, I, J and K of the display area 50.

The above embodiments have been described on the basis of the operation of controlling the position of the pointer 33 displayed on the display area of the DTV 10. However, the DTV 10 can perform other functions according to touch inputs received through the touch device 30 of the mobile terminal 10, as described above.

Figure 20:
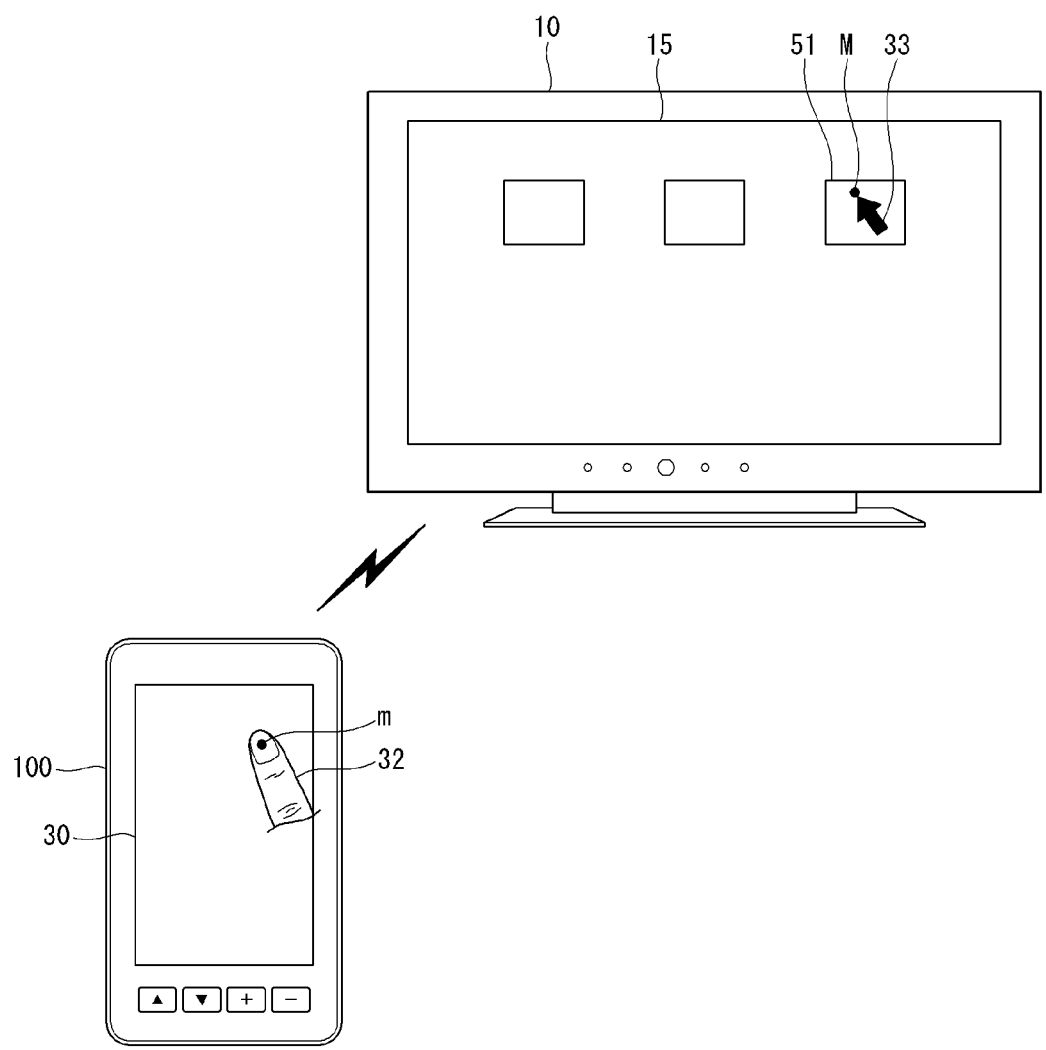
FIG. 20 illustrates an operation of controlling an icon displayed on the DTV 10.

FIG. 20 illustrates an operation of controlling an icon displayed on the display 15 of the DTV 10. Specifically, FIG. 20 is a view for explaining an operation of executing a function related to the icon displayed on the display 15 of the DTV 10 as a touch input is applied to the touch device 30 of the mobile terminal 100.

Referring to FIG. 20, the controller 20 (shown in FIG. 2) of the DTV 10 may display icons on the display 15. When the user touches a point m on the touch device 30, which corresponds to a point on which a specific icon 51 is displayed, the DTV 10 may locate the pointer 33 on the point on which the specific icon 51 is placed and select or execute the specific icon 51.

When the control information transmitted from the mobile terminal 100 to the DTV 10 includes the information about the intensity of the touch input, the DTV 10 can select or execute the specific icon 51 according to the intensity of the touch input, as described above. For example, the DTV 10 can select the specific icon when the intensity of the touch input is lower than the predetermined value and execute the specific icon 51 when the intensity of the touch input is higher than the reference value.

Figure 21:
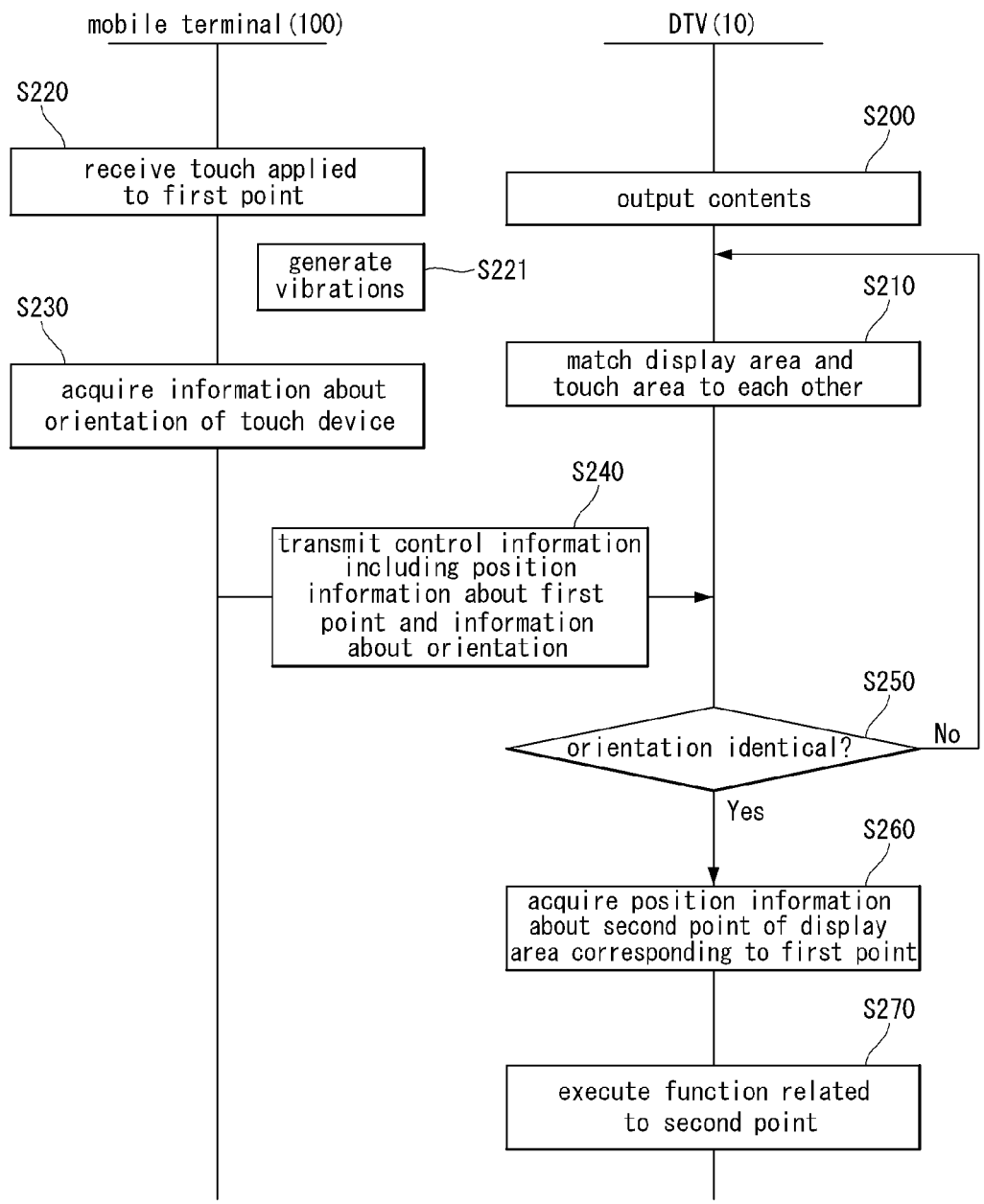
FIG. 21 is a flowchart illustrating a method of controlling a DTV according to another embodiment of this document.

FIG. 21 is a flowchart of a method of controlling a DTV according to another embodiment of this document. The method of controlling a DTV according to the current embodiment of this document can be implemented in the DTV 10 and the mobile terminal 100 explained with reference to FIGS. 1 through 5. The method of controlling a DTV according to the current embodiment of this document and operations of the DTV 10 and the mobile terminal 100 to implement the method will now be explained with reference to FIG. 21 and required figures.

The DTV 10 outputs contents in operation S200. The operation S200 is identical to the operation S140 shown in FIG. 6 so that detailed explanation thereof is omitted.

The DTV 10 matches the display area 15 and the touch area 30 to each other based on the absolute coordinate system in operation S210. The memory 21 of the DTV 10 may store information about the resolution of the touch area 30. The DTV 10 may perform the operation S210 with reference to the information about the resolution of the touch area 30, stored in the memory 21. In addition, the DTV 10 can execute the operation S210 in consideration of the orientation of the touch device 30. For example, the controller 20 of the DTV 10 can match the display area 15 and the touch area 30 to each other based on the state of the touch device 30 shown in FIG. 11(a).

Furthermore, the DTV 10 can perform the step S210 in consideration of the resolution of the contents or part of the display area 15 when the resolution of the contents displayed on the display 15 is changed or the part of the display 15 is set as the display area according to setting, as described above with reference to FIGS. 18 and 19.

The mobile terminal 100 receives a signal corresponding to a touch applied to a first point on the touch area 30 in operation S220. The mobile terminal 100 may control the haptic module 150 to generate vibrations when receiving the signal corresponding to the touch applied to the first point, as in the operation S111 shown in FIG. 6

The mobile terminal 100 may control the sensing unit 140 to acquire information about the orientation of the touch device 30 in operation S230. The method of acquiring the information about the orientation of the touch device 30 is identical to that described in the aforementioned embodiment.

The mobile terminal 100 transmits control information including the position information of the first point and the acquired orientation information to the DTV 10 in operation S240. The control information transmitted from the mobile terminal 100 to the DTV 10 may include information about the intensity of the touch applied to the first point, as described above.

The DTV 10 receives the control information from the mobile terminal 100. The DTV 10 determines whether the orientation of the touch device 30, included in the control information, corresponds to the current reference orientation in operation S250.

When the orientation information included in the control information does not correspond to the current reference orientation, the DTV 10 returns to the operation S210. Then, the DTV 10 re-performs the operation S210 in consideration of the received orientation information to match the touch area 30 and the display area 15 to each other one to one based on the current orientation of the touch device 30.

The DTV 10 may acquire position information of a second point on the display area 15 corresponding to the first point, which is included in the control information, according to the matching relationship between the touch area 30 and the display area 15 in operation S260.

Then, the DTV 10 may perform a function related to the second point in operation S270. The operation S270 is identical to the operation S150 shown in FIG. 6 so that detailed explanation thereof is omitted.

The above-described method of controlling a DTV or an electronic device may be written as computer programs and may be implemented in digital microprocessors that execute the programs using a computer readable recording medium. The method of controlling a DTV or an electronic device may be executed through software. The software may include code segments that perform required tasks. Programs or code segments may also be stored in a processor readable medium.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal capable of communicating with an electronic device including a display, comprising:
    a touch device;
    a communication unit configured to communicate with the electronic device;
    a sensing unit configured to sense an orientation of the touch device, wherein the orientation of the touch device is determined based on a rotation of the touch device on an axis perpendicular to a surface of the touch device; and
    a controller configured to:
        perform a first matching function where the controller matches a display area of the display included in the electronic device and a touch area of the touch device included in the mobile terminal to each other based on the absolute coordinate system;
        when a first point is touched at the touch area of the touch device included in the mobile terminal, generate control information including position information about a second point of the display area of the display included in the electronic device corresponding to the first point and intensity information of the touch at the first point;
        transmit the control information to the electronic device through the communication unit;
        detect the rotation of the touch device to be disposed in a landscape direction or a portrait direction and perform a second matching function where the controller:
            in response to detecting that the touch device is disposed in the portrait direction and the touch at the first point, generates the control information including the position information and matches a width side and a length side of the display area of the display with a length side and a width side of the touch area of the touch device, respectively, and
            in response to detecting that the touch device is disposed in the landscape direction and the touch at the first point, generates the control information including the position information and matches the width side and the length side of the display area of the display with the width side and the length side of the touch area of the touch device, respectively; and
        control the electronic device to perform different functions according to the intensity information of the touch of the first point,
    wherein the control information including the position information about the second point of the display area of the display included in the electronic device generated for the touch at the first point indicates a first location on the display area when the touch device is disposed in the portrait direction and indicates a second location on the display area when the touch device is disposed in the landscape direction, and
    wherein the first location is different from the second location and both the first location and the second location correspond to the touch at the first point at the touch area of the touch device.

2. The mobile terminal of claim 1, wherein the sensing unit includes at least one of an acceleration sensor for sensing the rotation of the touch device on the axis perpendicular to the surface of the touch device and a grab sensor arranged around the touch device to sense an external object's touch point on a body of the mobile terminal.

3. The mobile terminal of claim 2, wherein the controller uses one of the acceleration sensor and the grab sensor as a main sensor and uses the other as an auxiliary sensor to sense the orientation variation when the sensing unit includes both the acceleration sensor and the grab sensor.

4. The mobile terminal of claim 1, wherein the controller matches the display area and the touch area to each other based on a resolution of the display or the display area.

5. The mobile terminal of claim 4, wherein information about the resolution of the display or the display area is previously stored in a memory of the mobile terminal or received from the electronic device.

6. The mobile terminal of claim 1, wherein the controller receives information about the resolution of contents displayed in the display area from the electronic device through the communication unit and matches the display area and the touch area to each other based on the information about the resolution of the contents.

7. The mobile terminal of claim 1, further comprising a haptic module configured to generate vibrations, wherein the controller controls the haptic module to generate vibrations when the touch area is touched.

8. The mobile terminal of claim 1, wherein the mobile terminal is a remote controller.

9. A mobile terminal capable of communicating with an electronic device including a display, comprising:
a touch device;
a communication unit configured to communicate with the electronic device;
a sensing unit configured to sense an orientation of the touch device, wherein the orientation of the touch device is determined based on a rotation of the touch device on an axis perpendicular to a surface of the touch device; and
a controller configured to:
match an entire touch area of the touch device of the mobile terminal with a partial display area of the display included in the electronic device, transmit control information including position information about a second point of the partial display area of the display included in the electronic device corresponding to a first point touched in the touch area of the touch device included in the mobile terminal, intensity information of the first point, and information about the current orientation of the touch device included in the mobile terminal to the electronic device through the communication unit,
in response to detecting that the touch device is disposed in a portrait direction and a touch at the first point, generate the control information including the position information and match a width side and a length side of the display area of the display with a length side and a width side of the touch area of the touch device, respectively, and
in response to detecting that the touch device is disposed in a landscape direction and the touch at the first point, generate the control information including the position information and match the width side and the length side of the display area of the display with the width side and the length side of the touch area of the touch device, respectively,
wherein the control information controls the electronic device to perform different functions according to the intensity information of the first point,
wherein the control information including the position information about the second point of the display area of the display included in the electronic device generated for the touch at the first point indicates a first location on the display area when the touch device is disposed in the portrait direction and indicates a second location on the display area when the touch device is disposed in the landscape direction, and
wherein the first location is different from the second location and both the first location and the second location correspond to the touch at the first point at the touch area of the touch device.

10. The mobile terminal of claim 9, wherein the sensing unit includes at least one of an acceleration sensor for sensing the rotation of the touch device on the axis perpendicular to the surface of the touch device and a grab sensor arranged around the touch device to sense an external object's touch point on a body of the mobile terminal.

11. An electronic device capable of communicating with a mobile terminal including a touch device, comprising:
a display including a display area;
a communication unit configured to communicate with the mobile terminal; and
a controller configured to
perform a first matching function where the controller matches the display area of the display included in the electronic device and a touch area of the touch device included in the mobile terminal to each other based on the absolute coordinate system,
receive control information including position information about a second point of the display area of the display included in the electronic device which corresponds to a first point touched at the touch area of the touch device from the mobile terminal through the communication unit and intensity information about the touch of the first point touched,
execute a function relating to the first point touched through the display area of the display included in the electronic device, which corresponds to the first point of the touch area of the touch device included in the mobile terminal, and
detect a rotation of the touch device to be disposed in a landscape direction or a portrait direction and perform a second matching function where the controller:
in response to detecting that the touch device is disposed in the portrait direction and a touch at the first point, receives the control information include the position information and matches a width side and a length side of the display area of the display with a length side and a width side of the touch area of the touch device, respectively, and
in response to detecting that the touch device is disposed in the landscape direction and the touch at the first point, receives the control information including the position information and matches the width side and the length side of the display area of the display with the width side and the length side of the touch area of the touch device, respectively,
wherein the controller is further configured to execute a specific function based on the intensity information of the first point touched,
wherein the control information including the position information about the second point of the display area of the display included in the electronic device generated for the touch at the first point indicates a first location on the display area when the touch device is disposed in the portrait direction and indicates a second location on the display area when the touch device is disposed in the landscape direction, and
wherein the first location is different from the second location and both the first location and the second location correspond to the touch at the first point at the touch area of the touch device.

12. The mobile terminal of claim 11, wherein the function relating to the first point touched through the display area includes at least one of a function of locating a pointer on the second point of the display area, a function of selecting an icon located on the point of the display area and a function of executing the icon.

13. The mobile terminal of claim 11, wherein the controller matches the display area and the touch area to each other based on a resolution of the display or the display area.

14. The mobile terminal of claim 11, wherein the controller matches the display area and the touch area to each other based on a resolution of contents displayed in the display area.

15. The mobile terminal of claim 11, wherein the mobile terminal is a remote controller.

16. A method of controlling an electronic device including a display through a mobile terminal capable of communicating the electronic device, the method comprising:

sensing an orientation of a touch device of the mobile terminal, wherein the orientation of the touch device included in the mobile terminal is determined based on a rotation of the touch device included in the mobile terminal on an axis perpendicular to a surface of the touch device included in the mobile terminal;

performing a first matching function, the first matching function including matching a display area of the display included in the electronic device and a touch area of the touch device included in the mobile terminal to each other based on the absolute coordinate system;

receiving a touch input applied to a first point included in the touch area of the touch device included in the mobile terminal;

transmitting, to the electronic device, control information including position information about a second point of the display area of the display included in the electronic device, which corresponds to the first point, and intensity information about the touch input applied to the first point, and detecting the rotation of the touch device to be disposed in a landscape direction or a portrait direction and performing a second matching process, the second matching process including:

in response to detecting that the touch device is disposed in the portrait direction and the touch input applied to the first point, generating the control information including the position information and matching a width side and a length side of the display area of the display with a length side and a width side of the touch area of the touch device, respectively; and in response to detecting that the touch device is disposed in the landscape direction and the touch input applied to the first point, generating the control information including the position information and matching the width side and the length side of the display area of the display with the width side and the length side of the touch area of the touch device, respectively, wherein a specific function is executed at the electronic device based on the intensity information about the touch input, wherein the control information including the position information about the second point of the display area of the display included in the electronic device generated for the touch input applied to the first point indicates a first location on the display area when the touch device is disposed in the portrait direction and indicates a second location on the display area when the touch device is disposed in the landscape direction, and wherein the first location is different from the second location and both the first location and the second location correspond to the touch input applied to the first point at the touch area of the touch device.

17. The method of claim 16, wherein the matching of the display area and the touch area to each other is performed based on a resolution of the display, the resolution of the display area or the resolution of contents displayed in the display area.

18. A non-transitory computer readable recording medium storing a program for executing the control method of claim 16.

19. A server storing a program for executing the control method of claim 16.

20. A method of controlling an electronic device including a display through a mobile terminal capable of communicating the electronic device, the method comprising:

matching an entire touch area of the touch device of the mobile terminal with a partial display area of the display included in the electronic device;

receiving a touch input applied to a first point included in the touch area of the touch device included in the mobile terminal;

acquiring information about an orientation of the touch device included in the mobile terminal, wherein the orientation of the touch device included in the mobile terminal is determined based on a rotation of the touch device on an axis perpendicular to a surface of the touch device included in the mobile terminal;

in response to detecting that the touch device is disposed in a portrait direction and the touch input applied to the first point, generating control information including position information about a second point of the display area of the display included in the electronic device and matching a width side and a length side of the display area of the display with a length side and a width side of the touch area of the touch device, respectively; and in response to detecting that the touch device is disposed in a landscape direction and the touch input applied to first point, generating the control information including the position information and matching the width side and the length side of the display area of the display with the width side and the length side of the touch area of the touch device, respectively;

transmitting the control information including the position information about the second point, intensity information about the touch input applied to the first point, and the information about the orientation to the electronic device, wherein a specific function is executed at the electronic device based on the intensity information about the touch input, wherein the control information including the position information about the second point of the display area of the display included in the electronic device generated for the touch input applied to the first point indicates a first location on the display area when the touch device is disposed in the portrait direction and indicates a second location on the display area when the touch device is disposed in the landscape direction, and wherein the first location is different from the second location and both the first location and the second location correspond to the touch input applied to the first point at the touch area of the touch device.

21. The method of claim 20, wherein the mobile terminal is a remote controller.

22. A method of controlling an electronic device capable of communicating with a mobile terminal including a touch device, the method comprising:

performing a first matching function, the first matching function including matching a display area of a display included in the electronic device and a touch area of the touch device included in the mobile terminal to each other based on the absolute coordinate system and information about an orientation of the touch device;

receiving, from the mobile terminal, control information including position information about a second point of the display area of the display included in the electronic device which corresponds to a first point touched through the touch device included in the mobile terminal and intensity information about a touch input at the first point;

executing a function relating to the second point of the display area of the display included in the electronic device, which corresponds to the touched point of the touch device included in the mobile terminal based on the intensity information about the touch input, and detecting the rotation of the touch device to be disposed in a landscape direction or a portrait direction and performing a second matching function, the second matching function including:

in response to detecting that the touch device is disposed in the portrait direction and the touch input at the first point, generating the control information including the position information and matching a width side and a length side of the display area of the display with a length side and a width side of the touch area of the touch device, respectively; and in response to detecting that the touch device is disposed in the landscape direction and the touch input at the first point, generating the controlling information including the position information and matching the width side and the length side of the display area of the display with the width side and the length side of the touch area of the touch device, respectively, wherein the control information including the position information about the second point of the display area of the display included in the electronic device generated for the touch input at the first point indicates a first location on the display area when the touch device is disposed in the portrait direction and indicates a second location on the display area when the touch device is disposed in the landscape direction, and wherein the first location is different from the second location and both the first location and the second location correspond to the touch input at the first point at the touch area of the touch device.

23. The method of claim 22, further comprising receiving information about the orientation of the touch device from the mobile terminal, wherein the matching of the display area and the touch area to each other is performed based on the information about the orientation of the touch device.

24. The method of claim 22, wherein the mobile terminal is a remote controller.

\* \* \* \* \*